United States Patent [19]

Gernhardt

[11] 3,724,670

[45] Apr. 3, 1973

[54] SEPARATING FLUIDS

[75] Inventor: John William Gernhardt, Tulsa, Okla.

[73] Assignee: Fram Corporation, East Providence, R.I.

[22] Filed: Feb. 12, 1971

[21] Appl. No.: 115,027

[52] U.S. Cl.................210/448, 210/497, 55/DIG. 37
[58] Field of Search.B01d/27/00; 210/483, 484, 488, 210/489, 497, 323, 456, 457, 458, 418, 407, 448, 348; 55/498, 510, DIG. 37

[56] References Cited

UNITED STATES PATENTS

| | | | |
|---|---|---|---|
| 2,823,760 | 2/1958 | Andersen | 55/500 X |
| 1,462,343 | 7/1923 | Jenkins | 55/DIG. 37 |
| 2,063,743 | 12/1936 | Kamrath | 210/484 X |
| 2,732,026 | 1/1956 | Folts | 55/510 |
| 3,528,546 | 9/1970 | McPherson | 210/489 X |

*Primary Examiner*—Reuben Friedman
*Assistant Examiner*—F. F. Calvetti
*Attorney*—Robert E. Hillman

[57] ABSTRACT

Separator for immiscible fluids having a closed end and an outlet spaced along an axis, a separating medium arranged with inlet and outlet faces generally parallel to the axis so that fluid having passed through the medium flows along the axis toward the outlet, and a multiplicity of flow-directing surfaces arranged adjacent one of said faces to direct fluid entering said separator in a direction having a component along said axis toward said closed end.

5 Claims, 4 Drawing Figures

PATENTED APR 3 1973 3,724,670

SEPARATING FLUIDS

This invention relates to separation of immiscible fluids, especially as carried out in coalescer-separator assemblies that dehydrate jet aircraft fuel.

Objects of the invention are to make possible a high rate of fluid flow through a separator, with minimum housing size and minimum pressure loss, while causing the fluid to utilize generally uniformly the entire surface area of the separating medium.

In general the invention features a fluid separator with a closed end and an outlet spaced along an axis, a separating medium arranged with inlet and outlet faces generally parallel to the axis so that fluid having passed through the medium flows along the axis toward the outlet, and a multiplicity of flow-directing surfaces arranged adjacent one of said faces to direct fluid entering said separator in a direction having a component along said axis toward said closed end. In preferred embodiments the flow-directing surfaces are provided by a cylindrical louvered perforated center-tube having generally rectangular openings three-eighths inch (axial dimension) × 1/16 inch on three-eighths inch centers in staggered rows, the center distance spacing between rows being three-fourths inch, with the louvers having an average slope to the axis of about 25 percent.

Other objects, features, and advantages will appear from the following description of a preferred embodiment taken together with the attached drawings in which.

Figure 1:
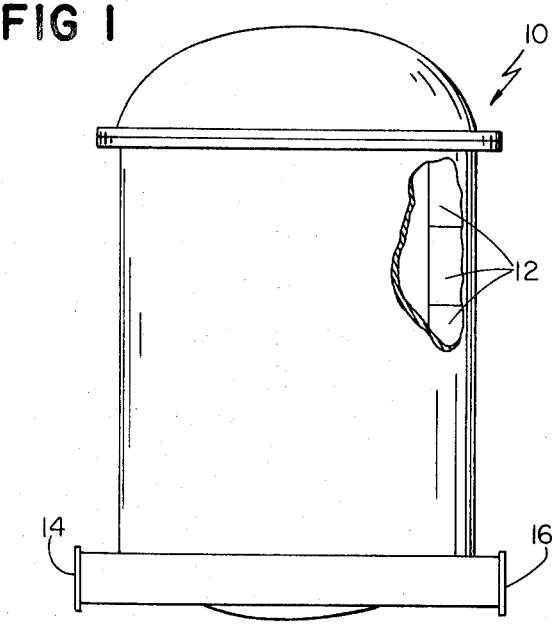
FIG. 1 is an elevational view, partially broken away, of a coalescer-separator.

Referring to the drawings, coalescer-separator 10 is a device of the general type described, e.g., in U.S. Pat. No. 3,481,476, and includes a number of separator cartridges 12 between inlet 14 and outlet 16.

Figure 2:
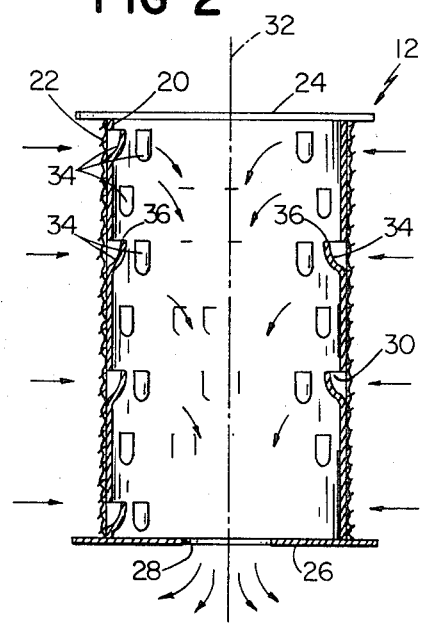
FIG. 2 is an axial section of a separator cartridge.
Figure 3:
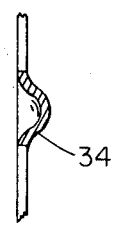
FIG. 3 is a transverse section through a louver.

Each cartridge 12 (FIG. 2) has a cylindrical metal center-tube 20 (length 11 inches, inside diameter 3.5 inches) surrounded by and in part supporting a cylinder 22 of a conventional medium (e.g., fine mesh screening) used to separate water from jet aircraft hydrocarbon fuel, the medium being pervious to the fuel but not to water. Solid end cap 24 closes one end of the cartridge, and annular end cap 26 provides an outlet 28 at the other end.

Figure 4:
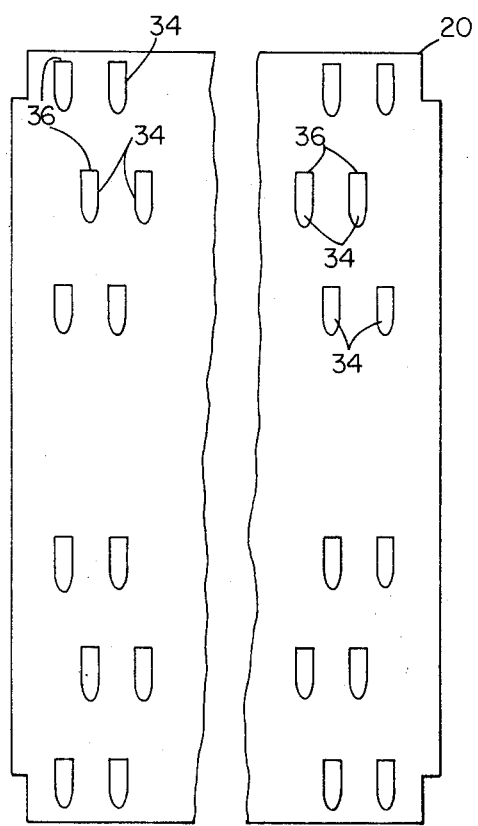
FIG. 4 is a plan view of a louvered center-tube, in unrolled form, broken away.

Center-tube 20 has 420 generally rectangular openings 30 measuring three-eighths inch along axis 32, and one-sixteenth inch along the tube circumference, located on three-eighths inch centers around the circumference in staggered rows (see FIG. 4), the center-distance spacing between rows being three-fourths inch. Flaps 34 punched from the openings extend inwardly by 0.1 inch at their free ends 36, each therefore having an average slope to axis 32 of about 25 percent.

In operation, as liquid passes through cylinder 22 and tube 20, from outside to inside, flaps 34 act as flow-directing louvers and cause the liquid to initially flow towards the closed end of the separator, thereby opposing the main flow inside the separator along axis 32 toward outlet 28. Since the velocity of that main flow increases with its axial distance from end cap 24, the resistance met by liquid passing through openings 30 in opposition to the main flow varies correspondingly along axis 32. Therefore, more liquid tends to flow through the portions of cylinder 22 near end cap 24 than would be the case in the absence of the louvers, thereby counteracting the usual tendency of the liquid to follow the path of least resistance and utilize disproportionately the portion of the medium nearest outlet 28. As a result, generally uniform utilization of the entire surface area of the separating medium is obtained, in a manner consistent with high flow rate per unit area, and low pressure loss.

Other embodiments will occur to those skilled in the art and are within the following claims.

What is claimed is:

1. A fluid separator comprising
   a closed end and an outlet spaced along an axis,
   a separating medium arranged with inlet and outlet faces generally parallel to said axis so that fluid having passed through said medium flows along said axis toward said outlet, and
   a multiplicity of flow-directing portions secured to structure fixed with respect to said closed end and arranged adjacent one of said faces to direct fluid entering said separator so as to have a velocity having a component directed along said axis toward said closed end.

2. The separator of claim 1 wherein said flow directing portions are flaps of a louvered tube.

3. The separator of claim 2 wherein said tube is a cylindrical centertube which at least partially supports and is radially inward of said medium.

4. The separator of claim 2 wherein said tube has generally rectangular openings with their largest dimension parallel to said axis.

5. The separator of claim 4 wherein said openings are arranged in staggered rows and said louvers have an average slope to said axis of about 25 percent.

* * * * *